Figure 1:
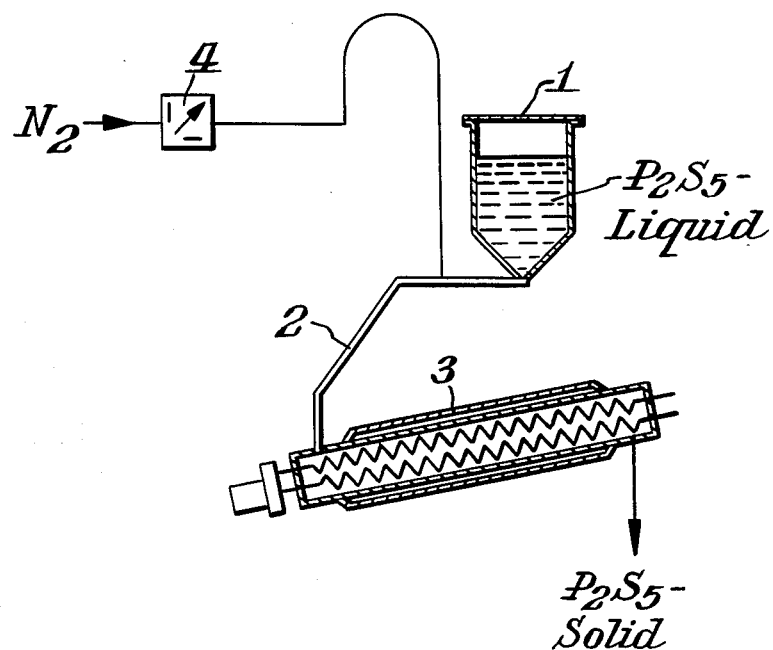

United States Patent [19]

Diskowski et al.

[11] Patent Number: 4,732,745
[45] Date of Patent: Mar. 22, 1988

[54] PROCESS FOR MAKING PHOSPHORUS PENTASULFIDE

[75] Inventors: Herbert Diskowski, Erftstadt; Heinz Stephan, Hürth; Hermann Niermann, Erftstadt, all of Fed. Rep. of Germany

[73] Assignee: Hoechst Aktiengesellschaft, Fed. Rep. of Germany

[21] Appl. No.: 935,007

[22] Filed: Nov. 26, 1986

[30] Foreign Application Priority Data

Dec. 10, 1985 [DE] Fed. Rep. of Germany ....... 3543522

[51] Int. Cl.$^4$ ............................................. C01B 25/14
[52] U.S. Cl. ..................................................... 423/303
[58] Field of Search .......................................... 423/303

[56] References Cited

U.S. PATENT DOCUMENTS 2,569,128  9/1951  Jones .................................. 423/303
2,844,442  7/1958  Lefforge ............................. 423/303
3,146,069  8/1964  Robota ............................... 423/303

FOREIGN PATENT DOCUMENTS 546662   9/1957  Canada ................................. 423/303
728583   2/1966  Canada ................................. 423/303
3006625  8/1981  Fed. Rep. of Germany ...... 423/303
1220014  1/1971  United Kingdom ................ 423/303

Primary Examiner—William R. Dixon, Jr.
Assistant Examiner—Wayne A. Langel
Attorney, Agent, or Firm—Connolly and Hutz

[57] ABSTRACT

Phosphorus pentasulfide is made. To this end gaseous nitrogen is introduced into the pipes feeding a reactor with a phosphorus melt and sulfur melt and/or into the outlet pipe for the phosphorus pentasulfide melt, the nitrogen being admitted under a pressure lower than the static pressure exerted in the pipes by the quantity of melt upstream of the gas inlets.

3 Claims, 2 Drawing Figures

PROCESS FOR MAKING PHOSPHORUS PENTASULFIDE

This invention relates to a process for making phosphorus pentasulfide wherein molten phosphorus and molten sulfur are introduced through separate feed pipes into a reactor, reacted therein at temperatures between 300° and 400° C., and the resulting phosphorus pentasulfide melt coming from the reactor is delivered to a cooling means.

The above feed materials are normally conveyed through metal pipes for which it is however necessary, especially when the conveying path is relatively long, to be heated so as to maintain the feed materials in the molten state.

Heating such metal pipes, especially those receiving the phosphorus pentasulfide melt, is a problem as it is invariably necessary for the pipes to be heated very regularly and for the heating to be controlled through a plurality of metering points. With respect to liquid phosphorus pentasulfide, it is desirable for it to present a temperature just slightly above its fusion point in order to avoid the formation of iron sulfides which in the end are liable to lock the pipes (cf. German Patent Specification DE-A No. 17 67 322).

Despite this, pure liquid phosphorus pentasulfide has again and again been found to lock the pipe conveying liquid phosphorus pentasulfide. The reason for this is believed to reside in the phenomenon reported in the literature (cf. J. Van Wazer "Phosphorus and its Compounds" volume, 1 page 301, Interscience Publishers, New York 1958) that pentasulfide melts, similarly to sulfur melts, are highly viscous within a certain temperature range above their fusion point. Within that temperature range, the flow through the pipes is greatly handicapped and the pipes become easily locked by material accumulating therein.

We have now unexpectedly found that molten feed materials, especially a phosphorus pentasulfide melt, can be reliably passed at high flow rate through the pipes in the process described hereinbelow by introducing gaseous nitrogen into the phosphorus feed pipe and simultaneously into the sulfur feed pipe running to the reactor, and/or into the phosphorus pentasulfide outlet pipe, the nitrogen being admitted at a level lower than the liquids level of the melt in the respective pipe and under a pressure lower than the static pressure exerted in the pipes by the quantity of melt upstream of the gas inlets.

Figure 2:
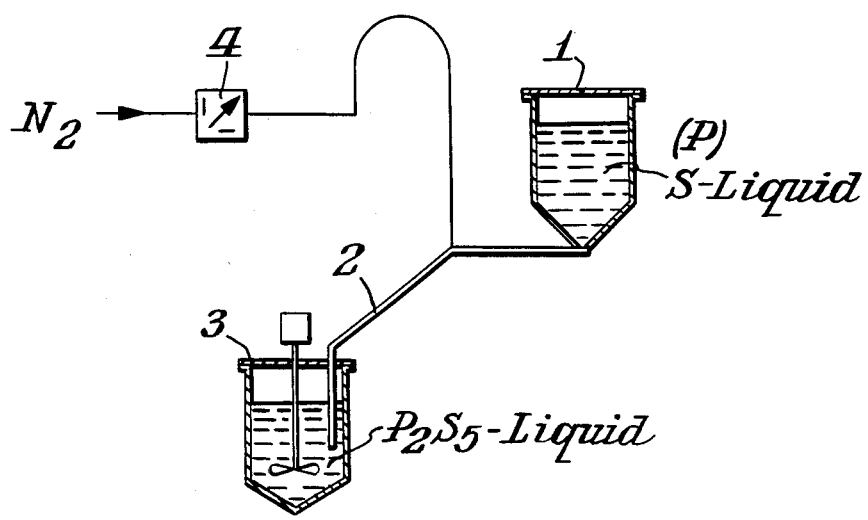

A preferred feature of the invention provides for the nitrogen to be used in a quantity which is 20 to 50% the volume of the melt in the respective pipe, and another preferred feature provides for the nitrogen to be admitted at the highest level of the pipes (cf. FIGS. 1 and 2 of the accompanying drawing).

The flow of the individual molten materials through the various pipes is no problem in the process of this invention which is also advantageous in respect of the following: It permits the pipes to be continuously monitored for potential material blocking the pipes, the quantity of flowing nitrogen being zero in a blocked pipe. In addition, the nitrogen atmosphere prevailing in the pipes permits oxidation and corrosion phenomena to be obviated.

EXAMPLE 1 (FIG. 1)

Liquid phosphorus pentasulfide coming from an electrically heated vessel 1 was passed at a temperature of 350° C. through an electrically heated pipe 2 to a cooling coil 3 in which it was converted to solid material. The liquids column in vessel 1 corresponded to a water column of 800 mm; the pressure of the incoming nitrogen was reduced to a pressure of 400 mm water column. 200 l/h nitrogen was passed through using a flow meter 4, and the quantity of liquid pentasulfide passed through was 500 l/h.

EXAMPLE 2 (FIG. 2)

Liquid sulfur (or phosphorus) coming from a heated vessel 1 was passed through a heated line 2 for liquid sulfur (or phosphorus) into a reactor 3 in which liquid $P_2S_5$ was maintained at 300°–400° C. while stirring. Nitrogen under a pressure corresponding to 400 mm water column was admitted to the pipes for sulfur (or phosphorus) with the use of a flow meter 4. The pressure of the supernatant liquid columns in the vessels receiving sulfur and phosphorus was about 500 mm water column and the pressure of the liquid $P_2S_5$-column in reactor 3 correspond to about 300 mm water column. Nitrogen was admitted at a rate of about 100 l/h per pipe and the volume of transported liquids was 200–350 l/h.

We claim:

1. In a process for making phosphorus pentasulfide, wherein a phosphorus melt and a sulfur melt are introduced through separate feed pipes from storage vessels into a reactor, reacted therein under nitrogen at temperatures between 300° C. and 400° C., and the resulting phosphorus pentasulfide melt is taken from the reactor through a discharge pipe and delivered to a cooling means, the improvement which comprises: introducing gaseous nitrogen into at least one of the said feed pipes for the phosphorus and the sulfur running to the reactor, and into the reactor discharge pipe for the phosphorus pentasulfide melt, the nitrogen being introduced into the pipes at a level lower than the liquids level of the melts in the respective storage vessels or in the reactor and under a pressure lower than the static pressure exerted in the pipes by the quantity of melt upstream of the gas inlets.

2. The process as claimed in claim 1, wherein the nitrogen is admitted in a quantity which is 50 to 20% the volume of the melt in the pipes.

3. The process as claimed in claim 1, wherein the nitrogen is admitted at the highest level of the respective pipes.

* * * * *